US012664905B2

(12) United States Patent
Henson

(10) Patent No.: US 12,664,905 B2
(45) Date of Patent: Jun. 23, 2026

(54) INFANT TEACHING ASSEMBLY

(71) Applicant: Alisa Henson, Tracy, CA (US)

(72) Inventor: Alisa Henson, Tracy, CA (US)

( * ) Notice: Subject to any disclaimer, the term of this patent is extended or adjusted under 35 U.S.C. 154(b) by 794 days.

(21) Appl. No.: 17/988,440

(22) Filed: Nov. 16, 2022

(65) Prior Publication Data

US 2024/0161641 A1    May 16, 2024

(51) Int. Cl.
G09B 5/02 (2006.01)
A61J 9/06 (2006.01)
B62B 9/24 (2006.01)

(52) U.S. Cl.
CPC .............. G09B 5/02 (2013.01); A61J 9/0623 (2015.05); B62B 9/24 (2013.01)

(58) Field of Classification Search
CPC .. G09B 5/02; G09B 5/06; A61J 9/0623; A61J 9/0638; A61J 9/0676; A61J 9/0661; A61J 9/00; A61J 9/06; A61J 9/0669; A61J 9/063; B62B 9/24; A45C 11/002; A45C 2013/306
See application file for complete search history.

(56) References Cited

U.S. PATENT DOCUMENTS

| | | | |
|---|---|---|---|
| 5,290,198 A | 3/1994 | Nakayama | |
| 5,480,043 A | * 1/1996 | Wingo ................. | A61J 9/0623 |
| | | | 215/396 |
| 5,944,533 A | 8/1999 | Wood | |
| 6,554,679 B1 | 4/2003 | Shackelford | |

| | | | |
|---|---|---|---|
| 6,739,933 B2 | * 5/2004 | Taylor ....................... | A45F 5/00 |
| | | | 446/28 |
| D490,864 S | 6/2004 | Yamazaki | |
| 2006/0062085 A1 | * 3/2006 | Evans .................... | G04B 47/02 |
| | | | 215/11.1 |
| 2008/0153384 A1 | 6/2008 | Friedland | |
| 2009/0233518 A1 | 9/2009 | Hui | |
| 2012/0295510 A1 | * 11/2012 | Boeckle .................. | G09B 5/06 |
| | | | 446/72 |
| 2013/0098932 A1 | * 4/2013 | Hunt ..................... | A61J 9/0623 |
| | | | 220/772 |
| 2016/0373152 A1 | * 12/2016 | Schmidt .............. | H04B 1/3888 |
| 2018/0122266 A1 | 5/2018 | Azartash | |

FOREIGN PATENT DOCUMENTS

| | | | | |
|---|---|---|---|---|
| KR | 20080109221 A | * 12/2008 | ............. | D06F 37/42 |
| KR | 20100050096 A | * 5/2010 | ............... | G09B 5/06 |

\* cited by examiner

*Primary Examiner* — Shawn M Braden

(57) ABSTRACT

An infant teaching assembly includes a feeding bottle that has a pair of curved handles to facilitate an infant to grip the curved handles. The feeding bottle has a planar mount that is integrated into the feeding bottle and a first mating member is attached to the planar mount. A personal electronic device is provided which stores an educational program and the personal electronic device is removably attachable to the planar mount. A second mating member is attached to the personal electronic device and the second mating member is matable to the first mating member for retaining the personal electronic device on the planar mount. In this way the personal electronic device is accessible to the infant such that the educational program communicates educational information through the personal electronic device to educate the infant while the infant is feeding from the feeding bottle.

9 Claims, 9 Drawing Sheets

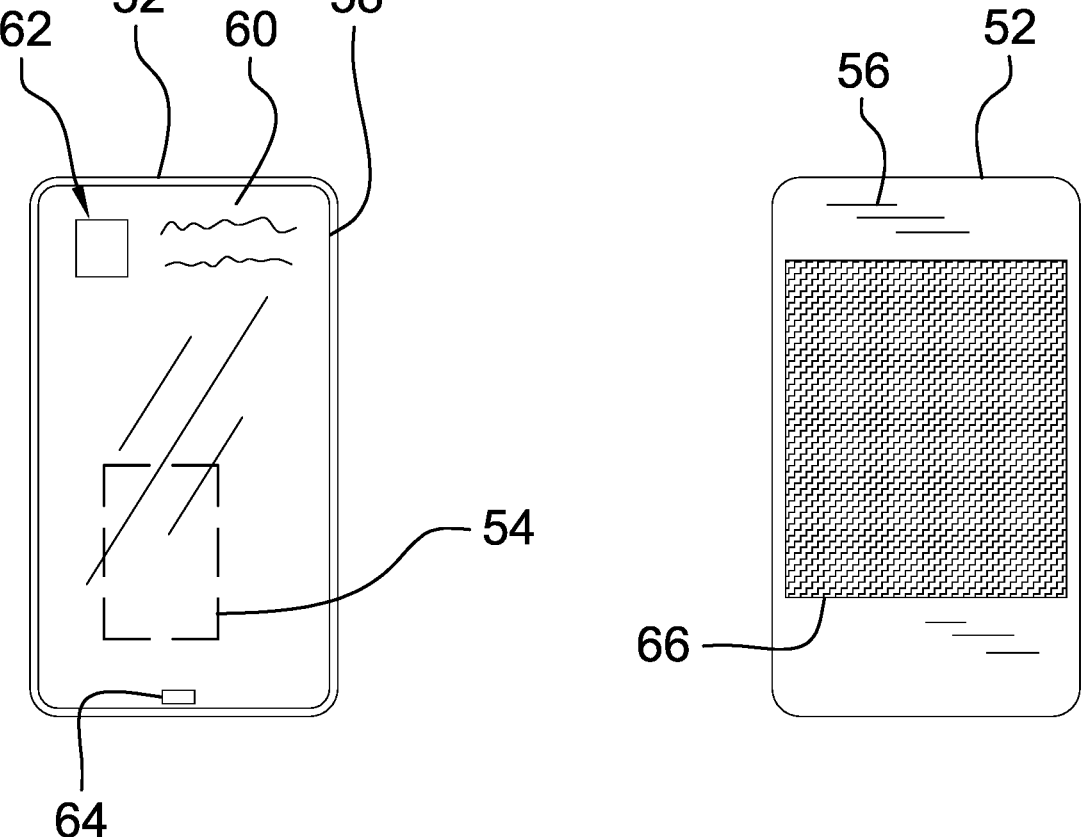
FIG. 4                    FIG. 5

INFANT TEACHING ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to teaching devices and more particularly pertains to a new teaching device for teaching an infant while the infant is feeding. The device includes a feeding bottle which has a planar mount integrated into the feeding bottle. The device includes a personal electronic device that stores an educational program. The device includes a first mating member attached to the planar mount and a second mating member attached to the personal electronic device. The first mating member is matable to the second mating member for attaching the personal electronic device to the feeding bottle.

(2) Description of Related Art Including Information Disclosed Under 37 CFR 1.97 and 1.98

The prior art relates to teaching devices including an animatronic doll which has a sensor for detecting when a feeding bottle is inserted into a mouth of the animatronic doll. The prior art discloses a teaching toy that includes a stuffed animal and a plurality of sensors attached to the stuffed animal. The prior art discloses a variety of interactive doll devices that each at least includes an electronic communication unit for verbally communicating with a child. The prior art discloses an interactive language learning method which includes a stuffed animal, a mobile electronic device in remote communication with the stuffed animal and a server which stores educational software.

(h) BRIEF SUMMARY OF THE INVENTION

An embodiment of the disclosure meets the needs presented above by generally comprising a feeding bottle that has a pair of curved handles to facilitate an infant to grip the curved handles. The feeding bottle has a planar mount that is integrated into the feeding bottle and a first mating member is attached to the planar mount. A personal electronic device is provided which stores an educational program and the personal electronic device is removably attachable to the planar mount. A second mating member is attached to the personal electronic device and the second mating member is matable to the first mating member for retaining the personal electronic device on the planar mount. In this way the personal electronic device is accessible to the infant such that the educational program communicates educational information through the personal electronic device to educate the infant while the infant is feeding from the feeding bottle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a front view of a personal electronic device of an embodiment of the disclosure.

FIG. 5 is a back view of a personal electronic device of an embodiment of the disclosure.

(j) DETAILED DESCRIPTION OF THE INVENTION

Figure 1:
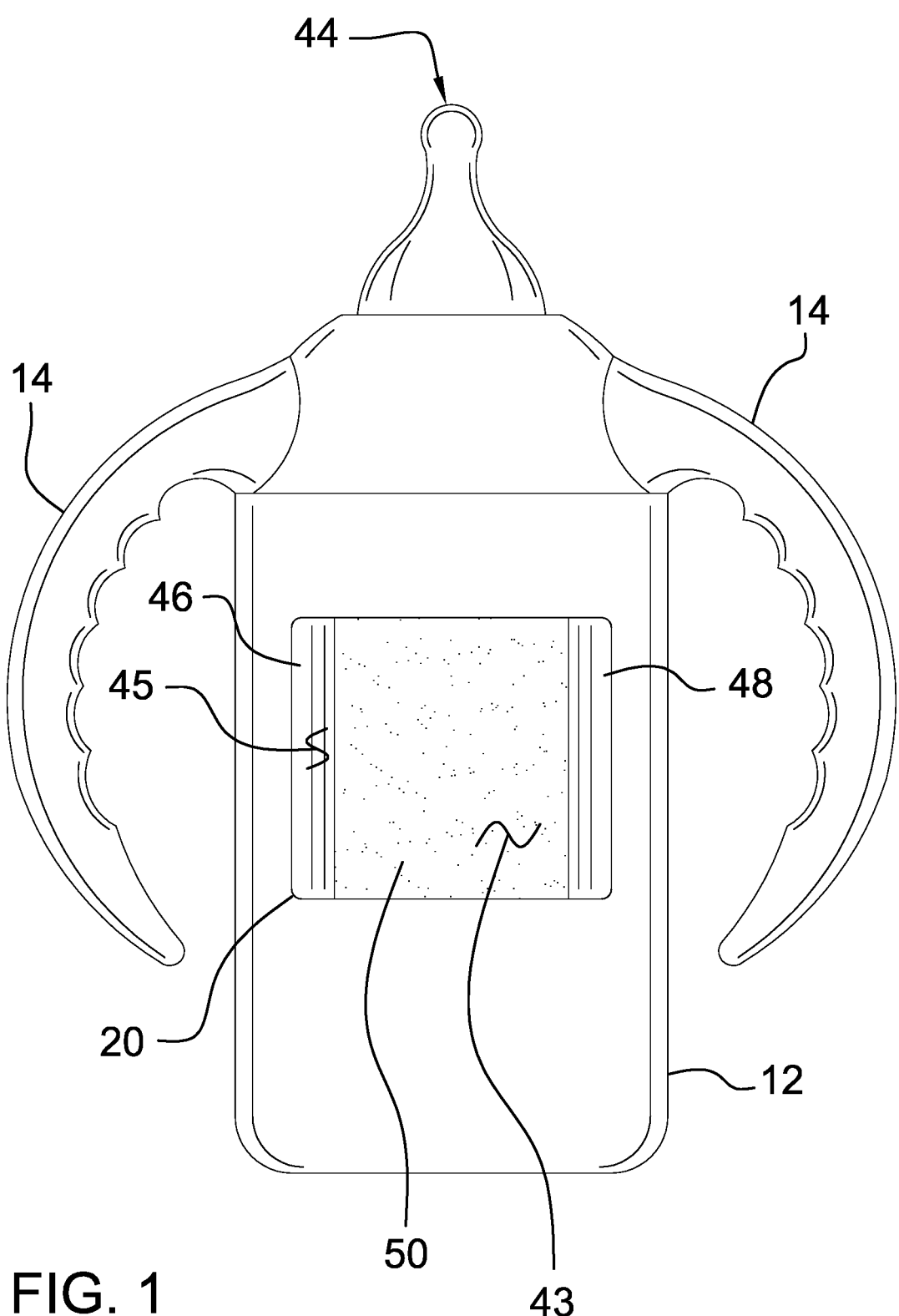
FIG. 1 is a front view of a feeding bottle of an embodiment of the disclosure.
Figure 2:
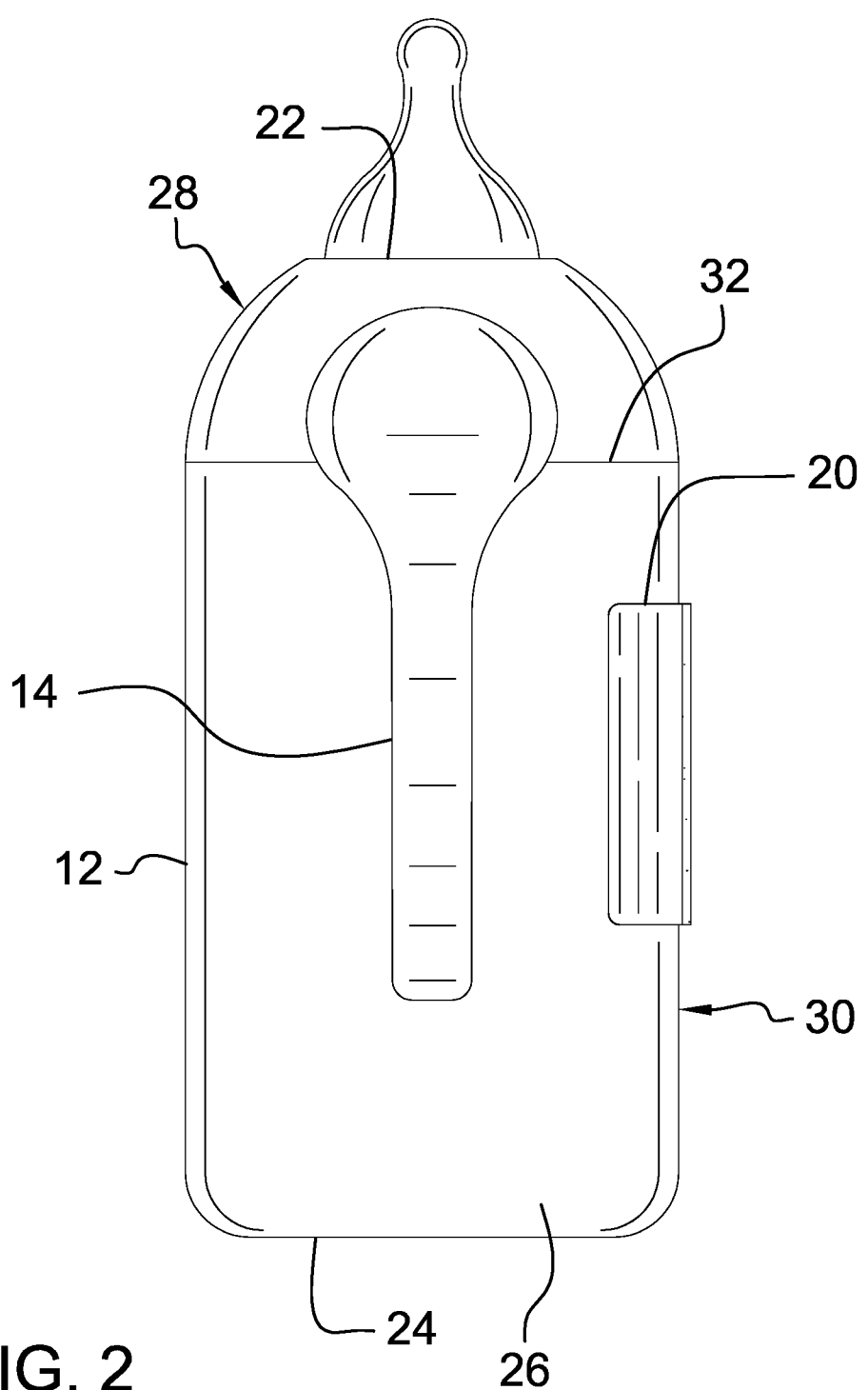
FIG. 2 is a right side view of an embodiment of the disclosure.
Figure 3:
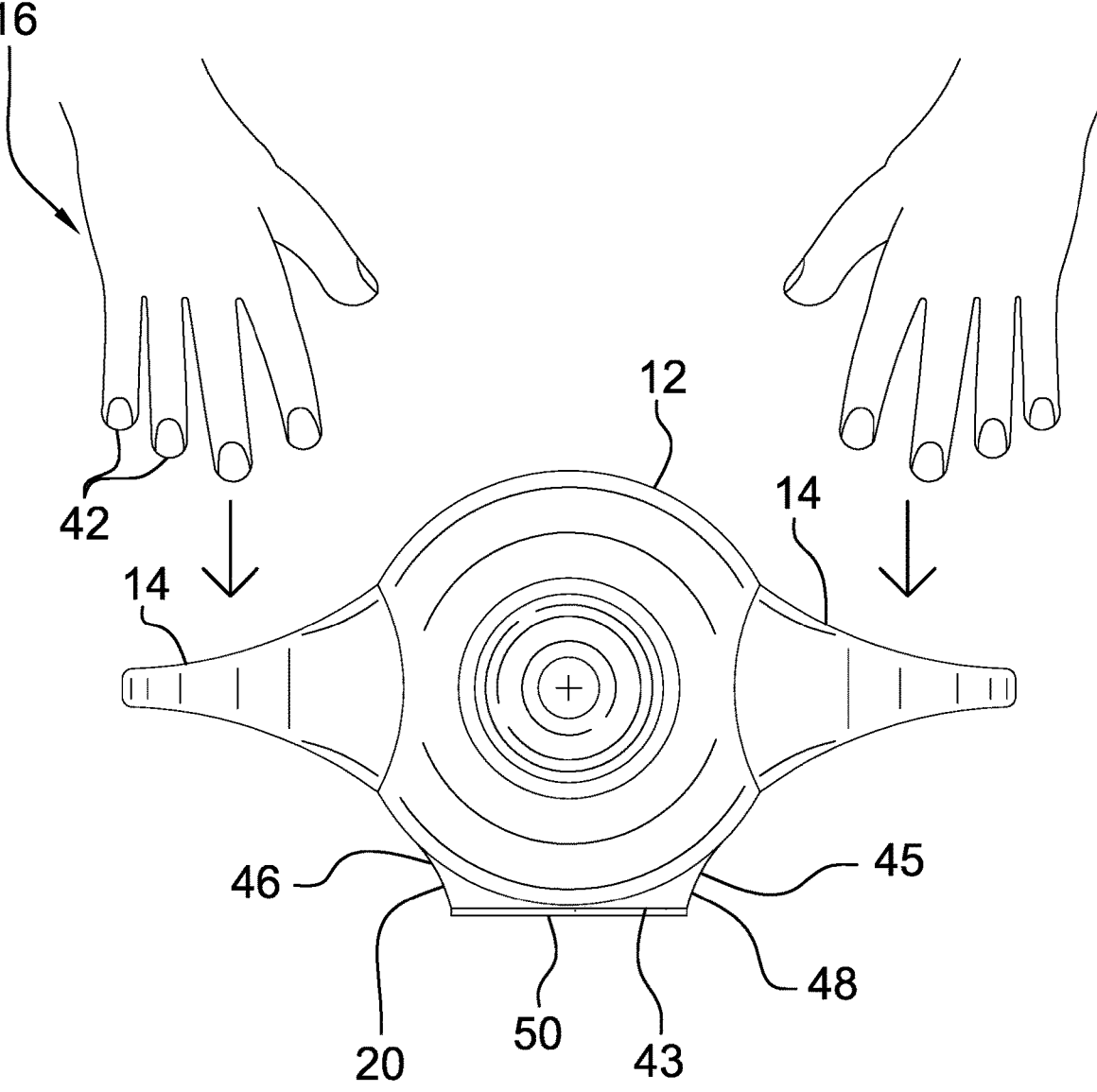
FIG. 3 is a top view of an embodiment of the disclosure.
Figure 6:
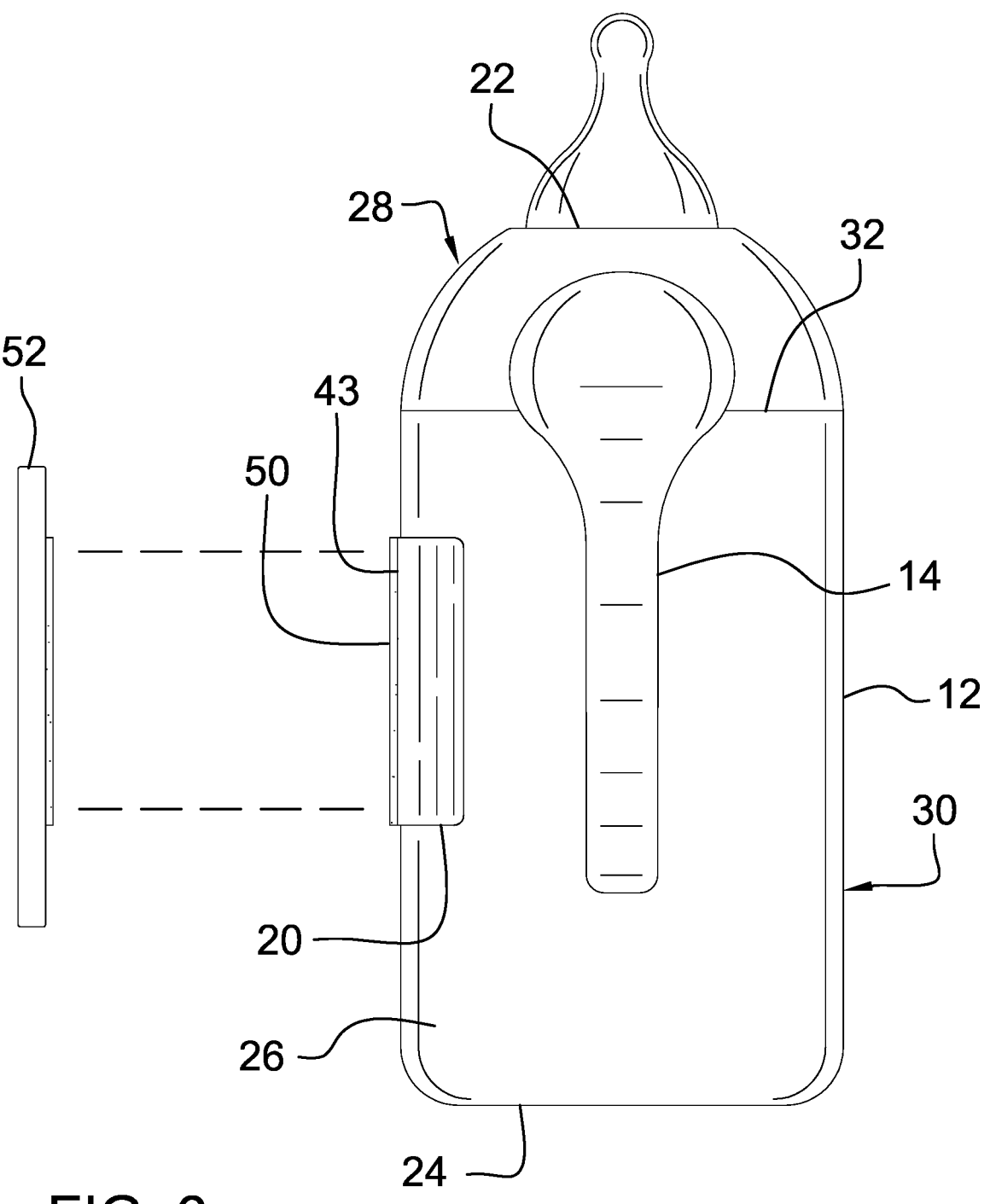
FIG. 6 is a left side exploded view of an embodiment of the disclosure.
Figure 7:
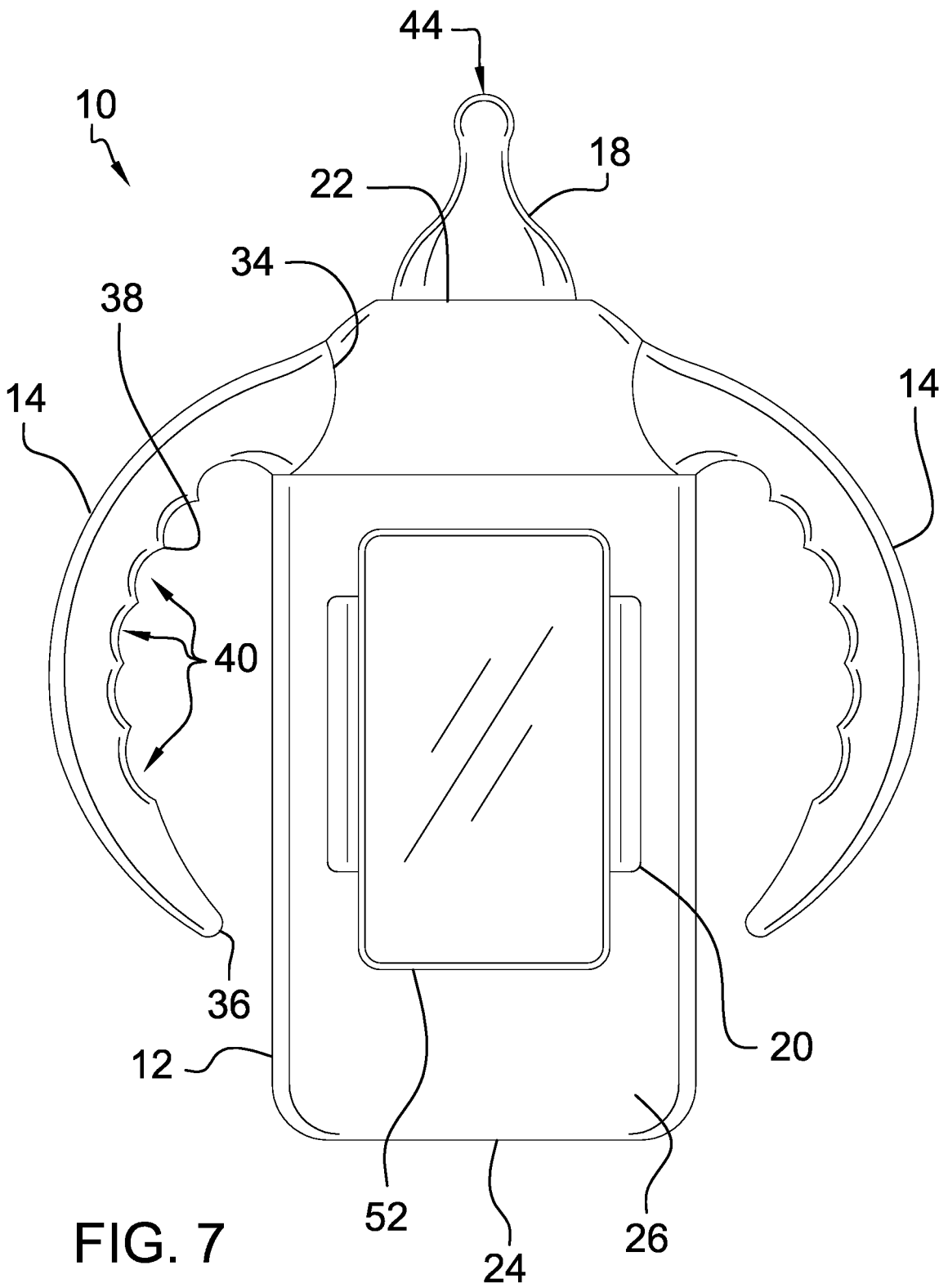
FIG. 7 is a front view of an infant teaching assembly according to an embodiment of the disclosure.

With reference now to the drawings, and in particular to FIGS. 1 through 10 thereof, a new teaching device embodying the principles and concepts of an embodiment of the disclosure and generally designated by the reference numeral 10 will be described.

As best illustrated in FIGS. 1 through 10, the infant teaching assembly 10 generally comprises a feeding bottle 12 that has a pair of curved handles 14 to facilitate an infant 16 to grip the curved handles 14 and a nipple 18 to facilitate the infant 16 to suckle on the nipple 18. Additionally, the feeding bottle 12 has a planar mount 20 that is integrated into the feeding bottle 12. The feeding bottle 12 has a top end 22, a bottom end 24 and an outer wall 26 extending between the top end 22 and the bottom end 24 and the outer wall 26 has a tapered portion 28 and a cylindrical portion 30. The tapered portion 28 extends from the top end 22 toward the bottom end 24; the cylindrical portion 30 extends between the tapered portion 28 and the bottom end 24. Furthermore, a threshold 32 between the tapered portion 28 and the cylindrical portion 30 is positioned closer to the top end 22 than the bottom end 24. The cylindrical portion 30 is continuously arcuate about an axis extending between the top end 22 and the bottom end 24. The tapered portion 28 curves inwardly between the threshold 32 and the top end 22 such that the top end 22 has a diameter that is less than a diameter of the cylindrical portion 30.

Each of the curved handles 14 has a coupled end 34 and a free end 36. The coupled end 34 of each of the curved handles 14 is attached to the tapered portion 28 having each of the curved handles 14 extending downwardly along the cylindrical portion 30. The curved handles 14 are positioned on opposing sides of the tapered portion 28 with respect to each other. Each of the curved handles 14 is curved between the coupled end 34 and the free end 36 such that each of the curved handles 14 curves outwardly from the cylindrical portion 30 having the free end 36 of each of the curved handles 14 being directed toward the cylindrical portion 30. Each of the curved handles 14 has an inwardly facing surface 38 that is directed toward the cylindrical portion 30.

Each of the curved handles 14 has a plurality of depressions 40 and each of the plurality of depressions 40 is integrated into the inwardly facing surface 38. The depressions 40 associated with each of the curved handles 14 are spaced apart from each other and are distributed between the coupled end 34 and a point located proximate the free end 36 for accommodating the infants fingers 42 to enhance gripping the curved handles 14. Each of the curved handles 14 is tapered to decrease in thickness between the coupled end 34 and the free end 36. The nipple 18 extends upwardly from the top end 22 of the feeding bottle 12 and the nipple 18 tapers to a bulb 44 that is distally positioned with respect to the top end 22.

The planar mount 20 has a distal surface 43 with respect to the cylindrical portion 30 of the outer wall 26 of the feeding bottle 12 and a perimeter surface 45 extending between the distal surface 43 and the cylindrical portion 30. The perimeter surface 45 has a first lateral side 46 and a second lateral side 48 and each of the first lateral side 46 and the second lateral side 48 flares outwardly between the distal surface 43 and the cylindrical portion 30. The distal surface 43 is spaced from the cylindrical portion 30 and the planar mount 20 is positioned closer to the threshold 32 between the tapered portion 28 and the cylindrical portion 30 than the bottom end 24. A first mating member 50 is provided and the first mating member 50 is attached to the planar mount 20. The first mating member 50 is bonded to the distal surface 43 of the planar mount 20 and the first mating member 50 completely covers the distal surface 43. Additionally, the first mating member 50 may comprise a hook portion of a hook and loop fastener.

A personal electronic device 52 is provided which stores an educational program 54. The personal electronic device 52 is removably attachable to the planar mount 20 thereby facilitating the personal electronic device 52 to be accessible to the infant 16 such that the educational program 54 communicates educational information through the personal electronic device 52. In this way the personal electronic device 52 can educate the infant 16 while the infant 16 is feeding from the feeding bottle 12. The personal electronic device 52 has a rear wall 56 and a front wall 58 and the personal electronic device 52 has a display 60 integrated into the front wall 58 for displaying indicia 62 comprising images and words associated with the educational program 54.

The personal electronic device 52 may comprise a smart phone or other similar electronic device that has digital data storage capabilities. The educational program 54 may include lessons pertaining to spelling and grammar, geography, history, colors or any other educational material that is appropriate for an infant. Furthermore, the personal electronic device 52 may include a speaker 64 for emitting audible sounds that are related to the educational material. In this way the infant 16 can be continuously exposed to audible lessons thereby increasing the likelihood that the infant 16 will retain the information relayed by the educational program 54.

A second mating member 66 is attached to the rear wall 56 of the personal electronic device 52. The second mating member 66 is matable to the first mating member 50 for retaining the personal electronic device 52 on the planar mount 20. Furthermore, the second mating member 66 may comprise a loop portion of a hook and loop fastener or the like.

Figure 8:
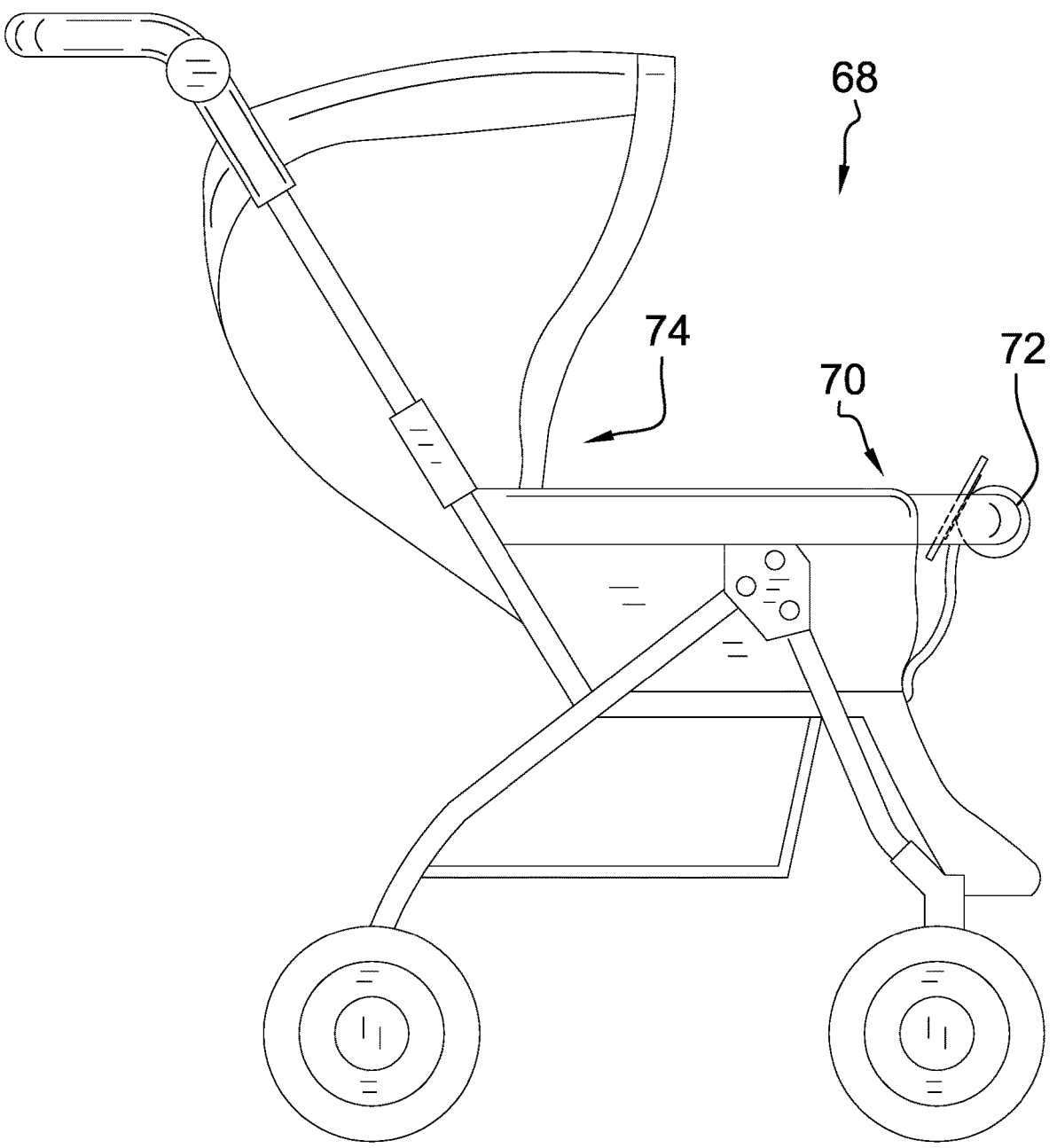
FIG. 8 is a perspective view of an alternative embodiment of the disclosure.

In an alternative embodiment 68 most clearly shown in FIG. 8, a stroller 70 is provided that has a restraint 72 which extends around the infant 16 when the infant 16 is positioned in the stroller 70. The stroller 70 may be a wheeled infant stroller of any conventional design. The first mating member 50 is attached to the restraint 72 such that the first mating member 50 faces a seat 74 of the stroller 70. In this way the personal electronic device 52 is directed toward the seat 74 when the second mating member 66 is mated to the first mating member 50.

Figure 9:
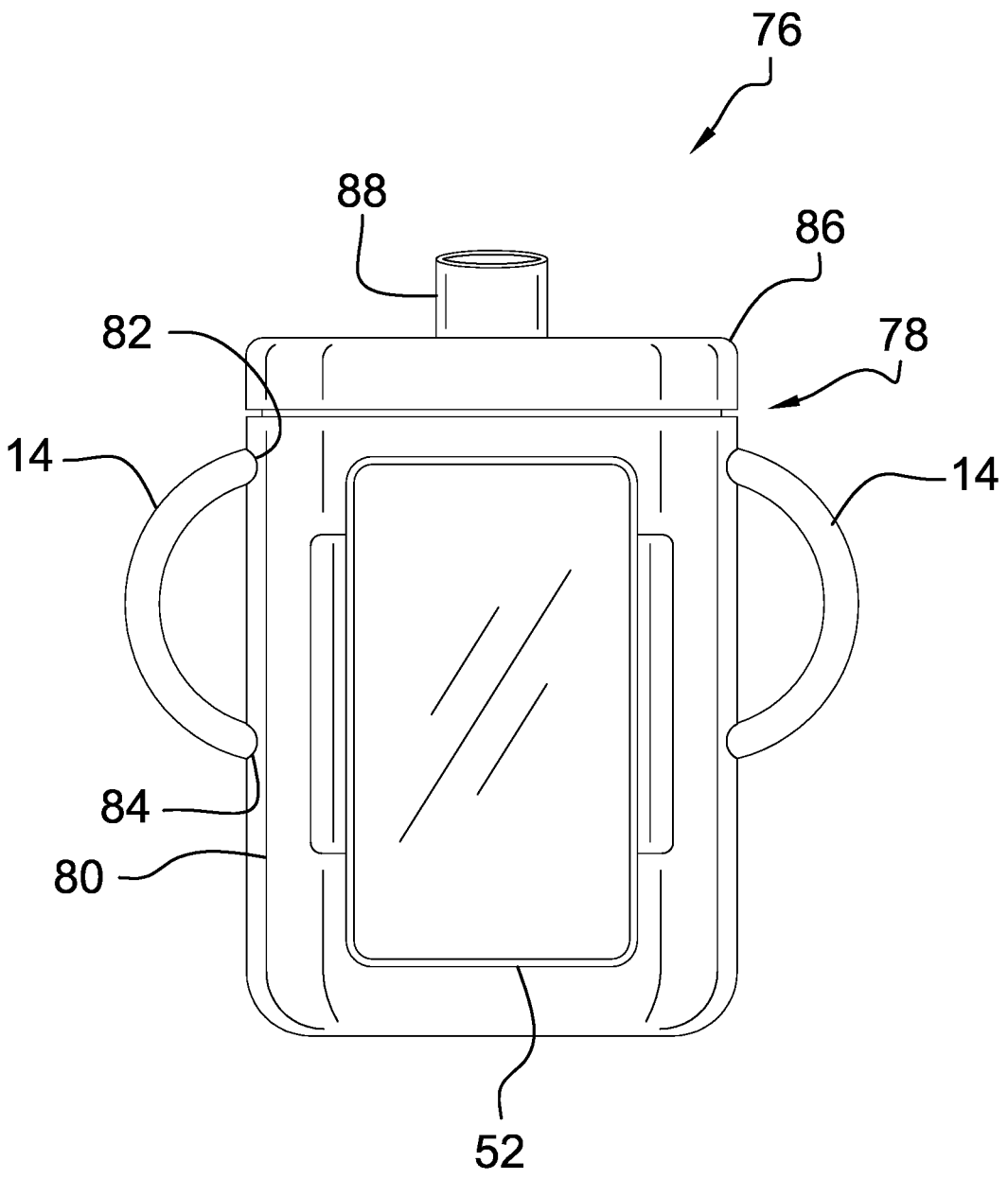
FIG. 9 is a front view of an alternative embodiment of the disclosure.

In an alternative embodiment 76 most clearly shown in FIG. 9, a cup 78 is provided which has an outside wall 80. Each of the curved handles 14 has a first end 82 and a second end 84 and each of the first end 82 and the second end 84 is attached to the outside wall 80. Furthermore, the planar mount 20 is integrated into the outside wall 80. A lid 86 is removably attachable to the cup 78 and the lid 86 has a spout 88 extending upwardly from the lid 86 thereby facilitating the infant 16 to feed from the spout 88.

Figure 10:
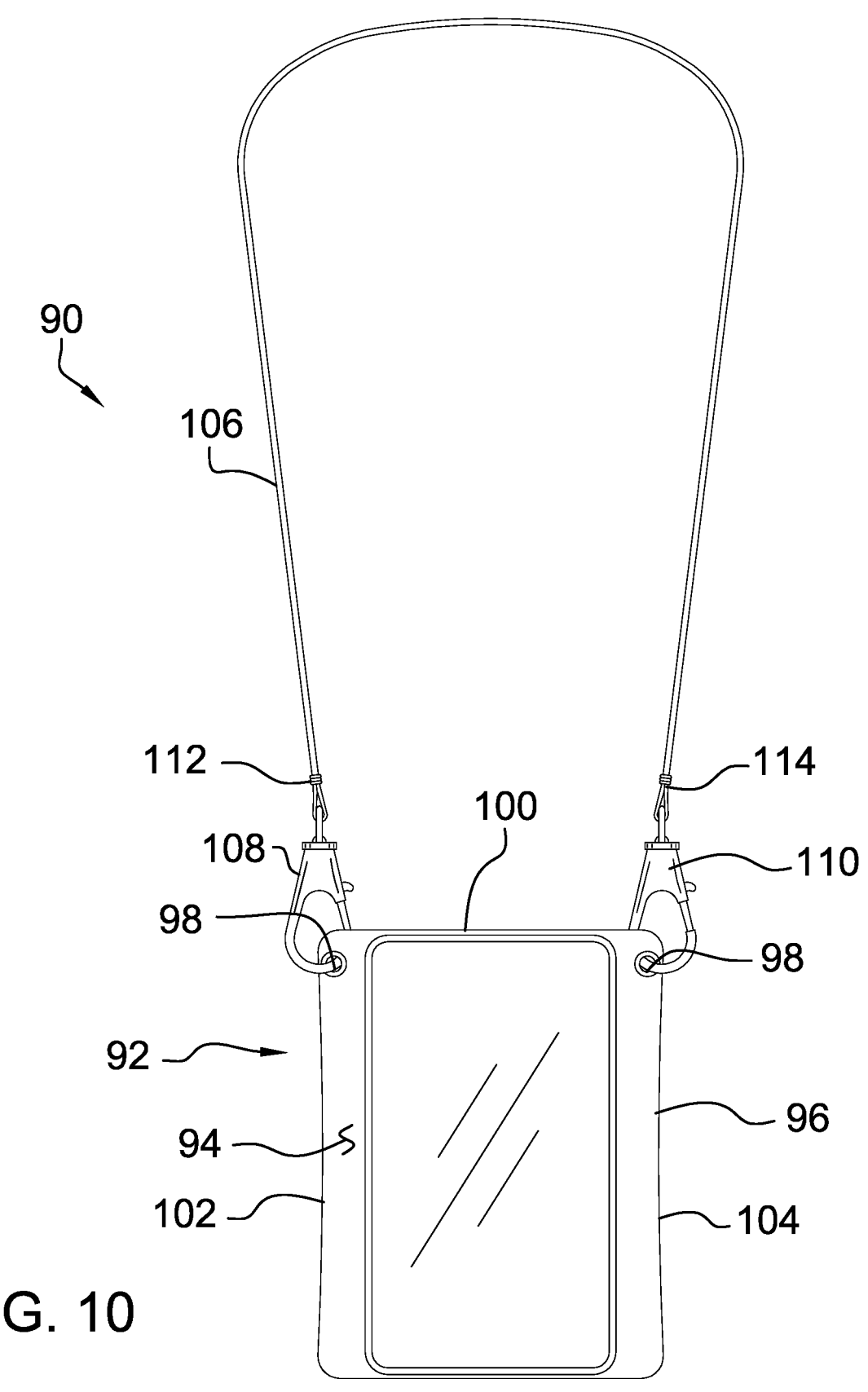
FIG. 10 is a front perspective view of an alternative embodiment of the disclosure.

In an alternative embodiment 90 most clearly shown in FIG. 10, a panel 92 is provided which has a forward surface 94 and a perimeter edge 96. The panel 92 has a pair of holes 98 extending through the panel 92 and each of the holes 98 is aligned with an intersection between a top side 100 of the perimeter edge 96 and a respective one of a first lateral side 102 and a second lateral side 104 of the perimeter edge 96. Additionally, the first mating member 50 is attached to the forward surface 92 of the panel 92. A lanyard 106 is included which has a first clasp 108 and a second clasp 110 each attached to a respective one of a first end 112 and a second end 114 of the lanyard 106. Each of the first clasp 108 and the second clasp 110 is extendable through a respective one of the holes 98 in the panel 92 thereby facilitating the panel 92 to be suspended on the infant 16 when the lanyard 106 is worn around the infant's neck.

In use, the feeding bottle 12 is filled with a liquid for feeding the infant 16 and the educational program 54 in the personal electronic device 52 is actuated to begin displaying images on the display 60 and emitting audible sounds through the speaker 64. The first mating member 50 is mated to the second mating member 66 thereby retaining the personal electronic device 52 on the feeding bottle 12. In this way the infant 16 can see the images displayed on the display 60 and hear the sounds emitted from the speaker 64 while the infant 16 is feeding on the feeding bottle 12. Thus, the infant 16 can be educated about a variety of topics ranging from geography and history to grammar and colors while the infant 16 is feeding.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An infant teaching assembly for teaching an infant while the infant is feeding, said assembly comprising:
   a feeding bottle having a pair of curved handles to facilitate an infant to grip said curved handles and a nipple to facilitate the infant to suckle on said nipple, said feeding bottle having a planar mount being integrated into said feeding bottle;
   a first mating member being attached to said planar mount;
   a personal electronic device storing an educational program, said personal electronic device being removably attachable to said planar mount thereby facilitating said personal electronic device to be accessible to the infant such that said educational program communicates educational information through said personal electronic device wherein said personal electronic device is configured to educate the infant while the infant is feeding from said feeding bottle; and
   a second mating member being attached to said personal electronic device, said second mating member being matable to said first mating member for retaining said personal electronic device on said planar mount;
   wherein said feeding bottle has a top end, a bottom end and an outer wall extending between said top end and said bottom end;
   wherein said outer wall has a tapered portion and a cylindrical portion, said tapered portion extending from said top end toward said bottom end, said cylindrical portion extending between said tapered portion and said bottom end, a threshold between said tapered portion and said cylindrical portion being positioned closer to said top end than said bottom end, said cylindrical portion being continuously arcuate about an axis extending between said top end and said bottom end, said tapered portion curving inwardly between said threshold and said top end such that said top end has a diameter being less than a diameter of said cylindrical portion;
   wherein said nipple extends upwardly from said top end of said feeding bottle, said nipple tapering to a bulb being distally positioned with respect to said top end; and
   wherein said planar mount has a distal surface with respect to said cylindrical portion of said outer wall of said feeding bottle and a perimeter surface extending between said distal surface and said cylindrical portion, said perimeter surface having a first lateral side and a second lateral side, each of said first lateral side and said second lateral side flaring outwardly between said distal surface and said cylindrical portion, said distal surface being spaced from said cylindrical portion, said planar mount being positioned closer to said threshold between said tapered portion and said cylindrical portion than said bottom end.

2. An infant teaching assembly for teaching an infant while the infant is feeding, said assembly comprising:
   a feeding bottle having a pair of curved handles to facilitate an infant to grip said curved handles and a nipple to facilitate the infant to suckle on said nipple, said feeding bottle having a planar mount being integrated into said feeding bottle;
   a first mating member being attached to said planar mount;
   a personal electronic device storing an educational program, said personal electronic device being removably attachable to said planar mount thereby facilitating said personal electronic device to be accessible to the infant such that said educational program communicates educational information through said personal electronic device wherein said personal electronic device is configured to educate the infant while the infant is feeding from said feeding bottle;
   a second mating member being attached to said personal electronic device, said second mating member being matable to said first mating member for retaining said personal electronic device on said planar mount;
   wherein said feeding bottle has a top end, a bottom end and an outer wall extending between said top end and said bottom end;
   wherein said outer wall has a tapered portion and a cylindrical portion, said tapered portion extending from said top end toward said bottom end, said cylindrical portion extending between said tapered portion and said bottom end, a threshold between said tapered portion and said cylindrical portion being positioned closer to said top end than said bottom end, said cylindrical portion being continuously arcuate about an axis extending between said top end and said bottom end, said tapered portion curving inwardly between said threshold and said top end such that said top end has a diameter being less than a diameter of said cylindrical portion;
   wherein said nipple extends upwardly from said top end of said feeding bottle, said nipple tapering to a bulb being distally positioned with respect to said top end;
   wherein each of said curved handles has a coupled end and a free end, said coupled end of each of said curved handles being attached to said tapered portion having each of said curved handles extending downwardly along said cylindrical portion, said curved handles being positioned on opposing sides of said tapered portion with respect to each other, each of said curved handles being curved between said coupled end and said free end such that each of said curved handles curves outwardly from said cylindrical portion having said free end of each of said curved handles being directed toward said cylindrical portion;

wherein each of said curved handles has an inwardly facing surface being directed toward said cylindrical portion, each of said curved handles having a plurality of depressions being integrated into said inwardly facing surface, said depressions associated with each of said curved handles being spaced apart from each other and being distributed between said coupled end and a point located proximate said free end for accommodating the infants fingers to enhance gripping said curved members; and wherein each of said curved handles is tapered to decrease in thickness between said coupled end and said free end.

3. The assembly according to claim 1, wherein said first mating member is bonded to said distal surface of said planar mount, said first mating member completely covering said distal surface.

4. The assembly according to claim 1, wherein:

said personal electronic device has a rear wall and a front wall, said personal electronic device having a display being integrated into said front wall for displaying indicia comprising images and words associated with said educational program; and said rear wall of said personal electronic device; and said second mating member is attached to said rear wall of said personal electronic device.

5. An infant teaching assembly for teaching an infant while the infant is feeding, said assembly comprising:

a feeding bottle having a pair of curved handles to facilitate an infant to grip said curved handles and a nipple to facilitate the infant to suckle on said nipple, said feeding bottle having a planar mount being integrated into said feeding bottle, said feeding bottle having a top end, a bottom end and an outer wall extending between said top end and said bottom end, said outer wall having a tapered portion and a cylindrical portion, said tapered portion extending from said top end toward said bottom end, said cylindrical portion extending between said tapered portion and said bottom end, a threshold between said tapered portion and said cylindrical portion being positioned closer to said top end than said bottom end, said cylindrical portion being continuously arcuate about an axis extending between said top end and said bottom end, said tapered portion curving inwardly between said threshold and said top end such that said top end has a diameter being less than a diameter of said cylindrical portion, each of said curved handles having a coupled end and a free end, said coupled end of each of said curved handles being attached to said tapered portion having each of said curved handles extending downwardly along said cylindrical portion, said curved handles being positioned on opposing sides of said tapered portion with respect to each other, each of said curved handles being curved between said coupled end and said free end such that each of said curved handles curves outwardly from said cylindrical portion having said free end of each of said curved handles being directed toward said cylindrical portion, each of said curved handles having an inwardly facing surface being directed toward said cylindrical portion, each of said curved handles having a plurality of depressions being integrated into said inwardly facing surface, said depressions associated with each of said curved handles being spaced apart from each other and being distributed between said coupled end and a point located proximate said free end for accommodating the infants fingers to enhance gripping said curved members, each of said curved handles being tapered to decrease in thickness between said coupled end and said free end, said nipple extending upwardly from said top end of said feeding bottle, said nipple tapering to a bulb being distally positioned with respect to said top end, said planar mount having a distal surface with respect to said cylindrical portion of said outer wall of said feeding bottle and a perimeter surface extending between said distal surface and said cylindrical portion, said perimeter surface having a first lateral side and a second lateral side, each of said first lateral side and said second lateral side flaring outwardly between said distal surface and said cylindrical portion, said distal surface being spaced from said cylindrical portion, said planar mount being positioned closer to said threshold between said tapered portion and said cylindrical portion than said bottom end;

a first mating member being attached to said planar mount, said first mating member being bonded to said distal surface of said planar mount, said first mating member completely covering said distal surface;

a personal electronic device storing an educational program, said personal electronic device being removably attachable to said planar mount thereby facilitating said personal electronic device to be accessible to the infant such that said educational program communicates educational information through said personal electronic device wherein said personal electronic device is configured to educate the infant while the infant is feeding from said feeding bottle, said personal electronic device having a rear wall and a front wall, said personal electronic device having a display being integrated into said front wall for displaying indicia comprising images and words associated with said educational program; and a second mating member being attached to said rear wall of said personal electronic device, said second mating member being matable to said first mating member for retaining said personal electronic device on said planar mount.

6. The assembly according to claim 5, wherein:

said assembly includes a stroller having restraint extending around the infant when the infant is positioned in said stroller; and said first mating member is attached to said restraint such that said first mating member faces a seat of said stroller thereby facilitating said personal electronic device to be directed toward said seat when said second mating member is mated to said first mating member.

7. The assembly according to claim 5, wherein:

said assembly includes a cup having an outside wall, each of said curved handles has a first end and a second end, each of said first end and said second end being attached to said outside wall, said planar mount being integrated into said outside wall; and a lid being removably attachable to said cup, said lid having a spout extending upwardly from said lid thereby facilitating the infant to feed from said spout.

8. The assembly according to claim 5, further comprising a panel having a forward surface and a perimeter edge, said panel having a pair of holes extending through said panel, each of said holes being aligned with an intersection between a top side of said perimeter edge and a respective one of a first lateral side and a second lateral side of said perimeter edge, said first mating member being attached to said forward surface.

9. The assembly according to claim 8, further comprising a lanyard having a first clasp and a second clasp each being attached to a respective one of a first end and a second end of said lanyard, each of said first clasp and said second clasp being extendable through a respective one of said holes in said panel thereby facilitating said panel to be suspended on the infant when said lanyard is worn around the infant's neck.

\* \* \* \* \*